United States Patent [19]
Adams

[11] 4,023,094
[45] May 10, 1977

[54] ELECTRONIC THERMOMETER
[76] Inventor: Robert P. Adams, 605 Hightree Road, Santa Monica, Calif. 90402
[22] Filed: Feb. 26, 1975
[21] Appl. No.: 553,220

Related U.S. Application Data
[63] Continuation of Ser. No. 265,651, June 23, 1972, abandoned.

[52] U.S. Cl. .................... 324/57 R; 73/362 AR; 128/2.1 R; 307/308; 219/505; 338/28; 324/DIG. 1; 324/62; 324/63; 324/65 R
[51] Int. Cl.$^2$ ........................ G01R 27/00
[58] Field of Search ........... 324/57 R, 62, DIG. 1, 324/65 R, 63; 73/362 AR; 128/2.1 R, 2.1 Z; 219/505; 307/308; 338/28

[56] References Cited
UNITED STATES PATENTS

| | | | |
|---|---|---|---|
| 2,326,274 | 8/1943 | Young | 324/DIG. 1 |
| 2,527,138 | 10/1950 | Kohler | 324/DIG. 1 |
| 2,971,379 | 2/1961 | Weisheit | 73/362 AR |
| 3,039,050 | 6/1962 | Krohn | 324/DIG. 1 |
| 3,148,339 | 9/1964 | Bell et al. | 324/DIG. 1 |
| 3,340,427 | 9/1967 | Bisso | 324/DIG. 1 |
| 3,350,941 | 11/1967 | Misevich et al. | 324/DIG. 1 |
| 3,494,196 | 2/1970 | Moussette | 73/362 AR |
| 3,545,273 | 12/1970 | Friberg et al. | 73/362 AR |
| 3,620,082 | 11/1971 | Peters | 73/362 AR |
| 3,732,443 | 5/1973 | Lovrenich | 307/308 |

Primary Examiner—Stanley T. Krawczewicz
Attorney, Agent, or Firm—Ellsworth R. Roston

[57] ABSTRACT

In an electronic thermometer a probe having a resistance which varies in accordance with the temperature of the region being sensed is connected to a resistance bridge having characteristics for determining and indicating the resistance of the probe. The temperature sensing element in the probe is constructed of materials whose characteristics are intrinsic and highly stable. The temperature sensing element is of small mass and is thermally isolated from the body of the probe so an accurate temperature can be measured in less than one second.

The resistance bridge can be in one of two states depending upon the direction of imbalance of the bridge. These two states are respectively characterized by a high or low output voltage which is relatively unaffected by the degree of imbalance. The transition between the two voltages is sharp, continuous, and well defined. In the low voltage state, the bridge has an extremely low power consumption.

The bridge has a precision impedance matching means which permit optimal mechanization with a wide range of components. A sheath for covering the probe can be a one-piece plastic part simply constructed at a low cost thereby making it economically disposable.

15 Claims, 16 Drawing Figures

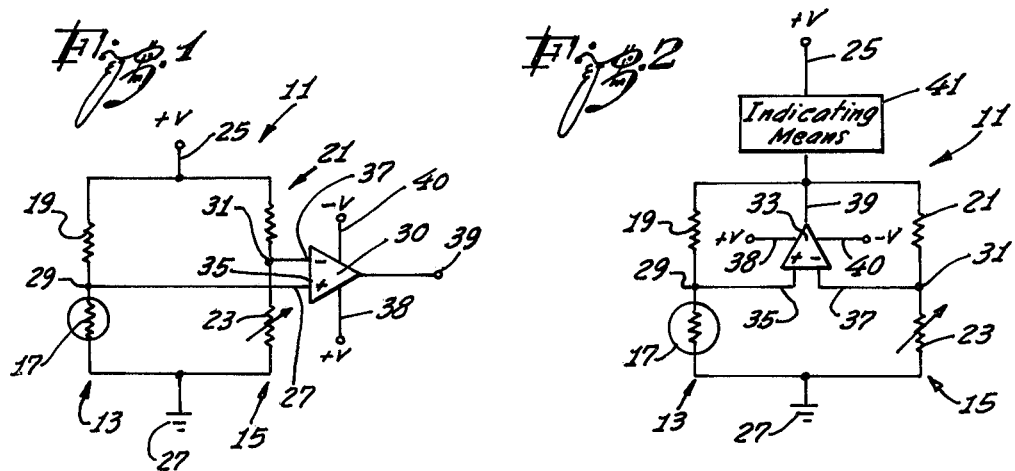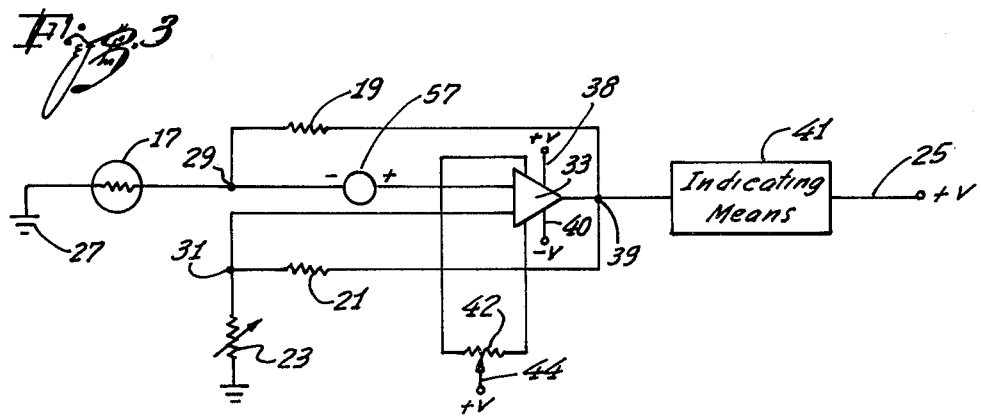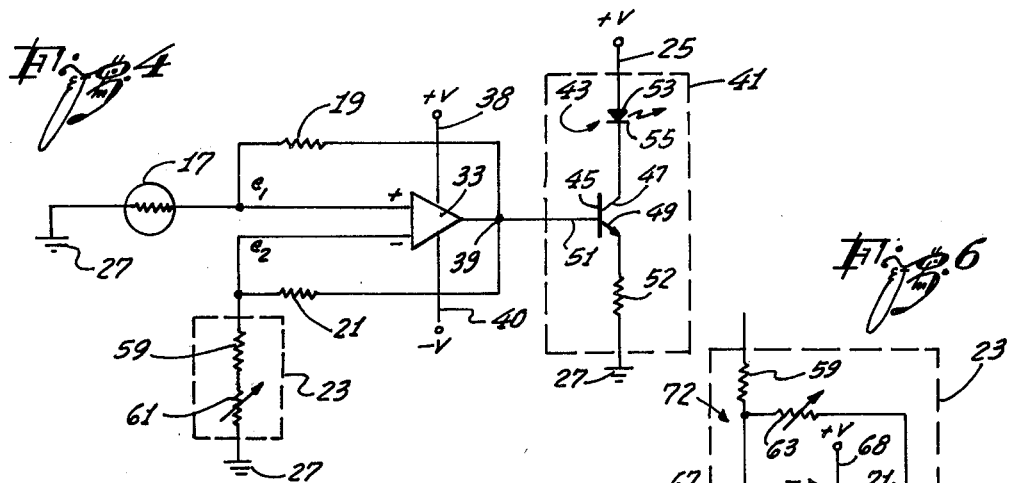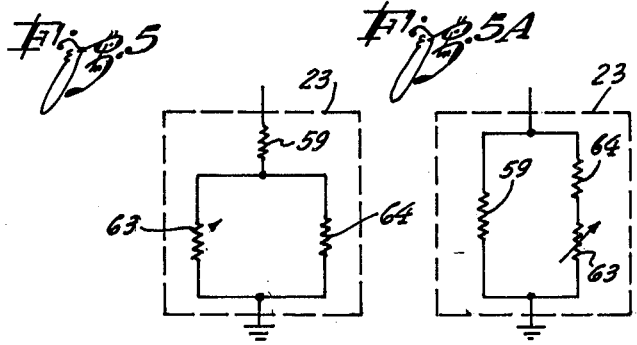

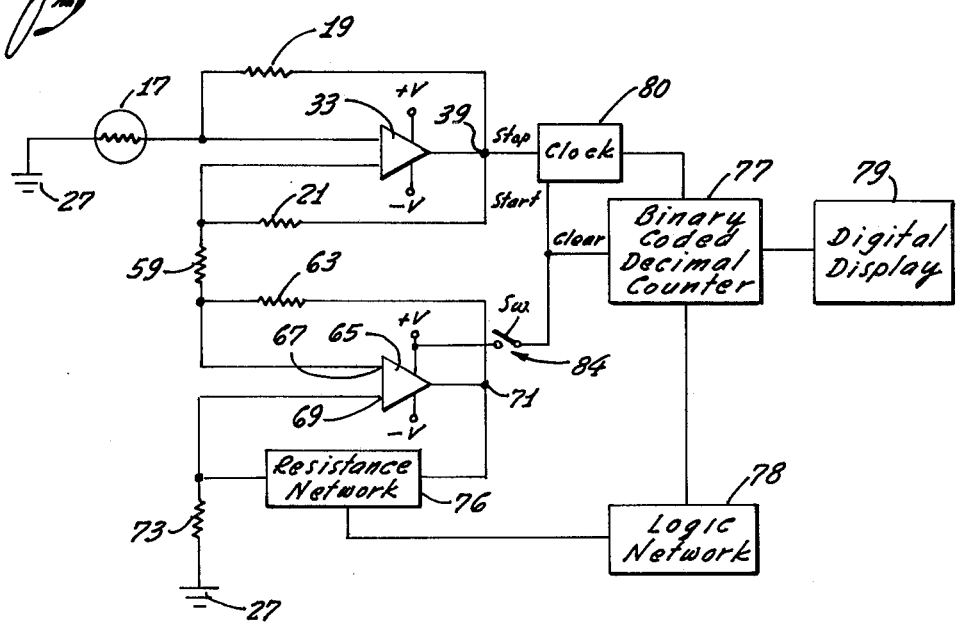
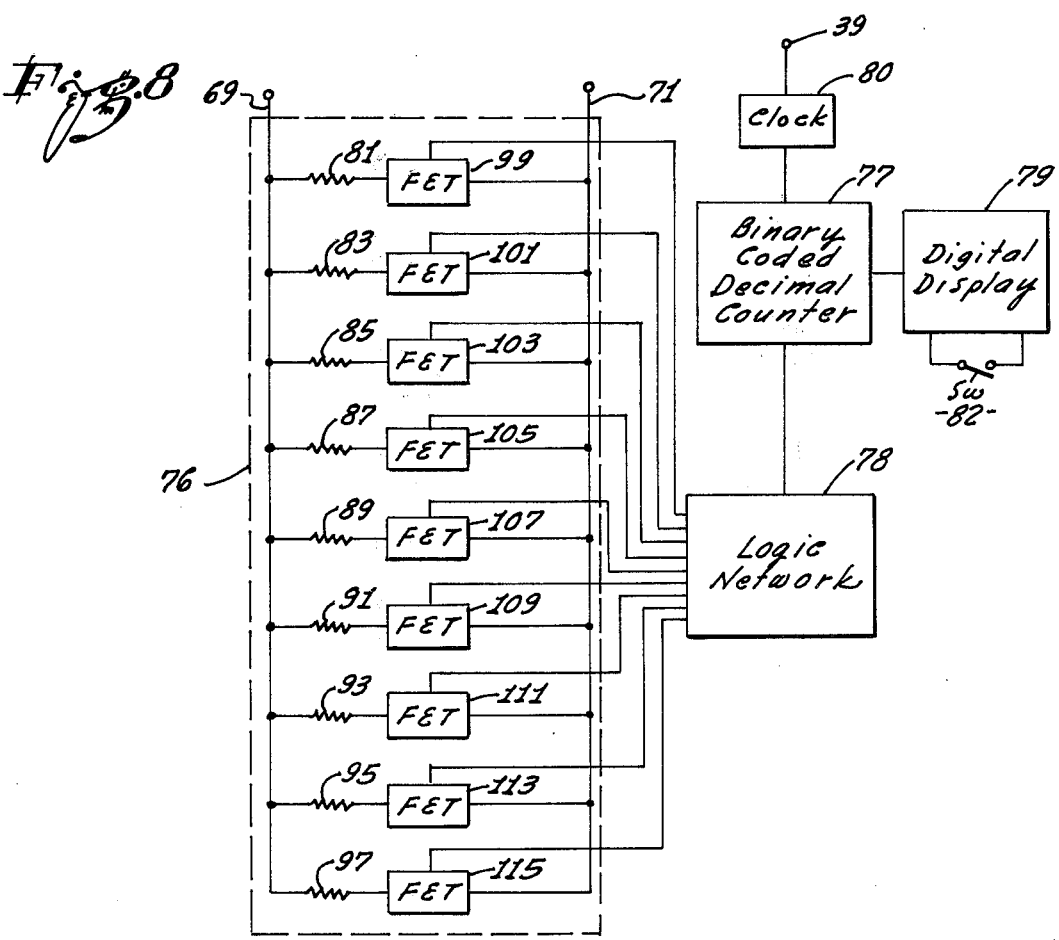

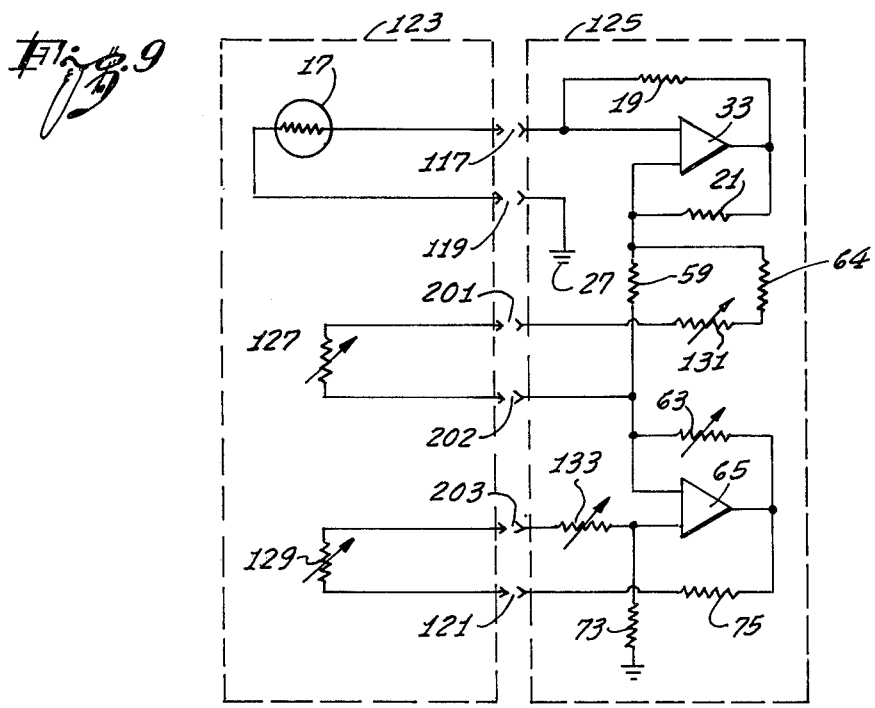
Fig. 9
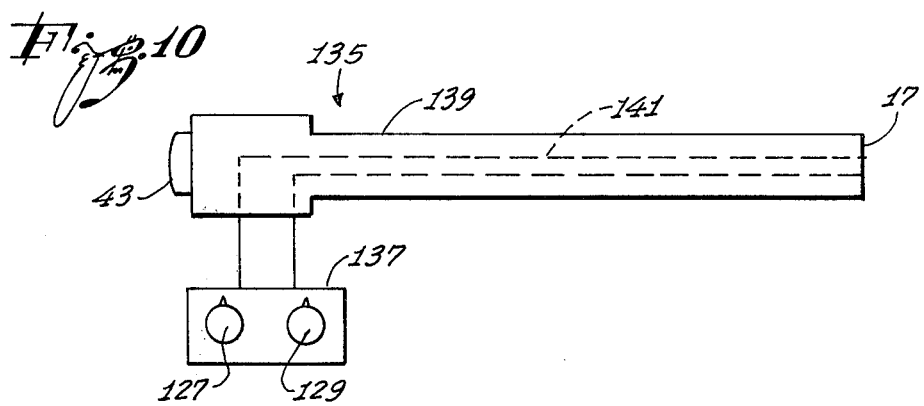
Fig. 10
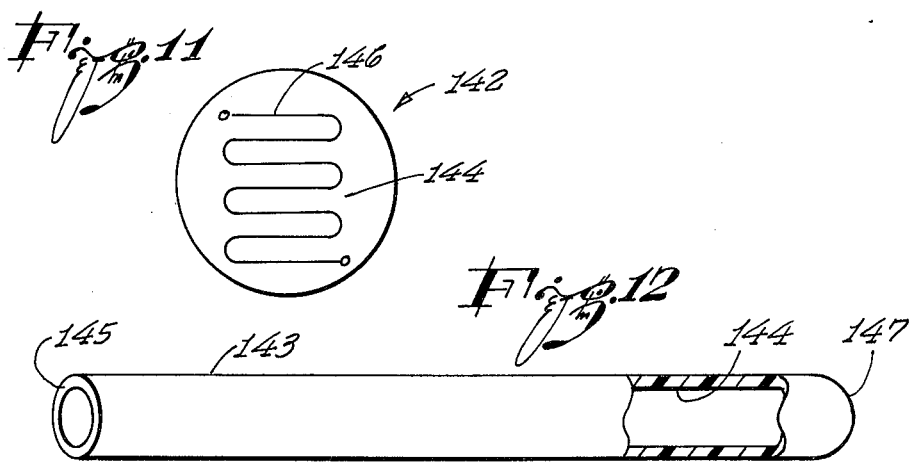
Fig. 11
Fig. 12

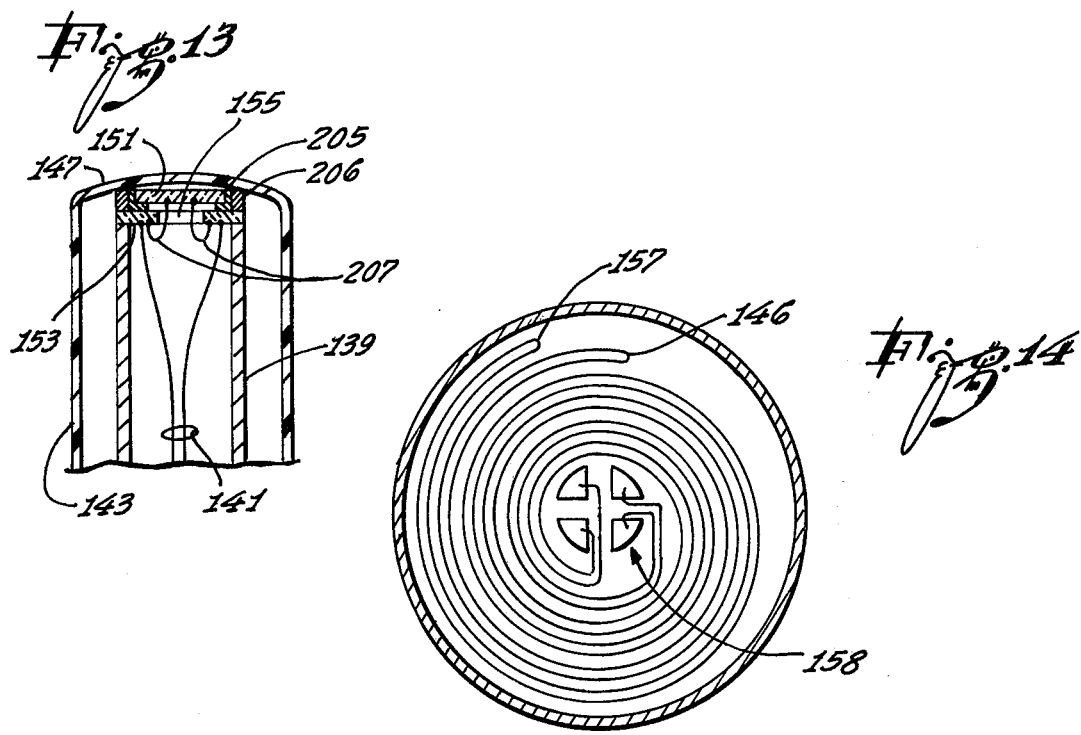
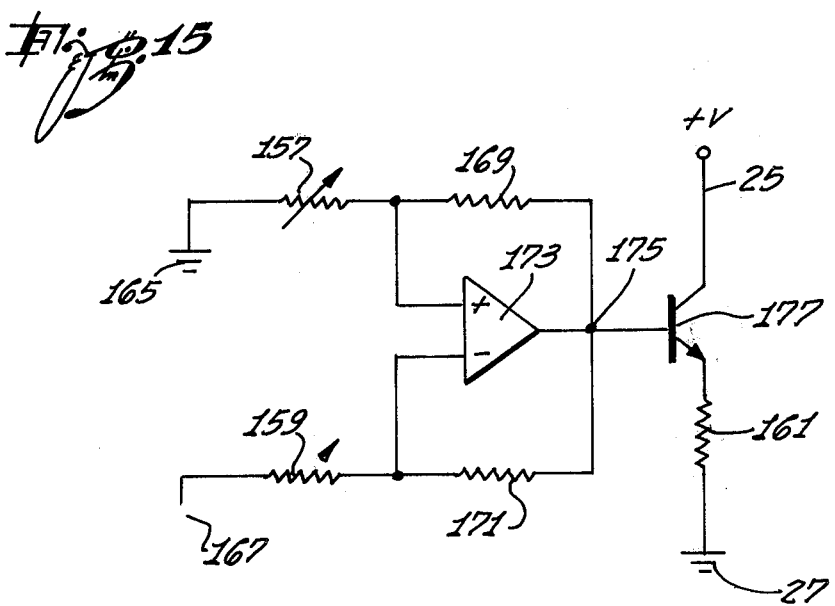

ELECTRONIC THERMOMETER

This is a continuation of application Ser. No. 265,651 filed June 23, 1972, now abandoned.

BACKGROUND OF THE INVENTION

1. Field of the Invention

This invention relates generally to resistance bridge networks and more specifically to their use in electronic thermometers. The invention also relates to resistance thermometers having the properties of providing a fast and accurate indication of temperature, particularly the temperature of a human being. The invention includes a method for providing a sensible, fast, reliable, and low power indiction of small changes in temperature. This particularly obtained by providing a novel probe and a sheath which has the additional advantage of being disposable.

2. Description of the Prior Art

Electronic thermometers of the prior art have included temperature sensing devices the resistance of which have varied in a known manner with their temperatures. The resistance of the temperature sensing devices typically has been measured by a Wheatstone bridge. The characteristics of the null detector used in electronic temperatures have been particularly important since the variations of resistors with temperatures have been slight and the slight variations of resistances have provided only minute variations in the indicating current. Stable resistance thermometers could be made with complex and expensive null detectors but these would be impractical. As a substitute, simple and less expensive null detectors have been used at a great sacrifice in accuracy.

In addition, the less expensive but inaccurate null detectors have been highly consumptive of power. For example, where batteries have been used to power the thermometers, typically less than 50 temperatures have been taken on a single battery charge.

It can be appreciated that the accuracy of the Wheatstone bridge is highly dependent upon the ability of the null detector to sense very small currents. Indeed, the closer the resistance ratios are to equality, the smaller the magnitude of the current flowing through the null detector. The prior art has provided null detectos which can satisfactorily measure very small current but these detectors been exceptionally expensive. For this reason accurate Wheatstone bridges are typically found in ultra-precise metrology laboratories where the accurate measurement of resistance is the sole criteria. In more practical applications, the Wheatstone bridge has been cumbersome, relatively difficult to operate, and far too expensive.

The temperature sensing devices in the present electronic thermometers have also been unsatisfactory in providing a resistance which predictably varies with its temperature. Thermistors have been used but their resistance/temperature characteristics have varied with age. Compunding the problem in the fact that the change in resistance of a thermistor is a nonlinear function of temperature. For these reasons, the temperature sensing devices have been unreliable so that even if its resistance could be accurately measured, the measurement might not provide an accurate indication of the temperature.

The temperature sensing devices of the prior art have a relatively large mass the temperaure of which must be changed in order to affect its resistance. It is well known, however, that a large mass requires more heat to change its temperatures than a smaller mass of the same material. In the case of an electronic thermometer this heat has typically been provided by the tissue of the patient whose temperature is being taken. As the tissue region gives up heat to the thermistor, the temperature of the region falls in proportion to the mass of the temperature sensing device. It follows that if the temperature of the tissue has fallen, the device cannot accurately reflect the original temperture of the region unless the region is reheated. Since the period of time required to reheat the region has also depended upon the mass of the temperature sensing device, it can be appreciated that the mass of the probe has had a great effect upon the length of time needed to take a temperature. Adding to this problem is the fact that heat is continually lost through the structure and wires supporting the temperature sensing device. Even when the tissue has acquired enough heat to raise its temperature, this continuing loss of heat to the structure indefinitely lowers the tissue temperature. To take a single temperature a period in excess of two minutes has been typical unless a high degree of operator's skill is relied upon in which case, a period of 15 seconds has been claimed.

The prior art has disclosed disposable sheaths which are designed to fit over the temperature sensing device on the end of a probe. These sheaths also have continuously drawn heat from the tissue. The sheaths have been constructed in a relatively complex and expensive manner, for example, in most cases they have been provided with a metal tip. To compound the problem, the metal tips have increased the mass of the region being heated.

For these reasons, the present electronic thermometers have been unsatisfactory in heating the thermistor and accurately developing a resistance which is predictable in view of the temperature of the thermistor. Furthermore, the relatively high current requirements of the bridges have substantially limited the portability of the electronic thermometers.

SUMMARY OF THE INVENTION

The foregoing deficiencies of the prior art have been overcome in accordance with the invention disclosed herein. For example, a null detector for the Wheatstone bridge can include a differential operational amplifier receiving input from the common terminal in each of the resistance branches. This inexpensive null detector can amplify the difference in the voltage on the common terminals so as to provide means for detecting the point of resistance equality.

In another embodiment, the output of the differential operational amplifier is connected to a terminal common to both the resistance branches. When the known resistance value exceeds the unknown resistance value the output signal rises rapidly and continuously to provide an indication at the point of equality which is related to the direction rather than the magnitude of the resistance ratios. Thus, even small differences in resistance can be accompanied by the high output signal of the differential operational amplifier. This feature provides sensitive and convenient null detection which can be achieved with inexpensive ordinary commerical components.

When the resistance ratios differ in a first direction, the voltage of the output signal can be relatively low so that very little current flows in the resistance branches.

In this state, the resistance bridge has an exceptionally low power drain. This feature gives rise to a preferred method of operation which permits the measurement of as many as 10,000 temperatures on a single battery charge. This can be particularly appreciated in comparison to the electronic thermometers of the prior art which typically measure fewer than 50 temperatures on a single battery charge. A design taking advantage of this feature could include a disposable battery which might be replaced as infrequently as once a year.

The resistance bridge is particularly adapted for use in an electronic thermometer wherein the unknown resistance is a temperature sensitive resistor. The temperature sensitive resistor can be mounted on the end of a probe and brought into contact with the tissue of a patient whose temperature is being measured. The probe can be provided with means for heating the probe to inhibit the drawing of heat from the tissue into the supporting structure.

The resistance bridge can be automated through the use of ordinary commerical components. Thus, a digital counter sensitive to the output of the bridge can vary the impedance of the known resistance in the bridge and simultaneously step a digital display to provide a visual indication of temperature. The features cooperate in a manner that permits the measurement of a temperature in only one second whereas probes of the prior art have taken as long as two minutes.

The temperature sensitive device can include platinum which is very stable with age and which has resistance and temperature characteristics which are highly predictable. This feature adds significantly to the reliability of the electronic thermometer.

Thus, the apparatus and method disclosed herein provide a means for rapidly heating a temperature sensitive resistor, a means for developing a resistance which is highly predictable in light of its temperrture, and a low power means for accurately calculating small variations in the unknown resistance. The apparatus is sensitive, convenient, small, and easily calibrated. It can be economically mechanized and easily automated with ordinary commerical components.

DESCRIPTION OF THE DRAWINGS

FIG. 1 is a schematic of a resistance bridge which includes a differential operational amplifier;

FIG. 2 is a schematic of another embodiment of the resistance bridge where the output of the differential operational amplifier provides the source of operating potential;

FIG. 3 is a schematic of the resistance bridge shown in FIG. 2 including means for compensating for imbalance in the differential operational amplifier;

FIG. 4 is a schematic of the resistance bridge shown in FIG. 2 including an embodiment of a variable resistance means and indicating means for indicating the point of instability FIG. 5 is a schematic of a further embodiment of the variable resistor which can be incorporated into the resistance bridge shown in FIG. 3;

FIG. 5A is a schematic of another embodiment of the variable resistor in the resistance bridge shown in FIG. 3;

FIG. 6 is a schematic of another embodiment of the variable resistor in the resistance bridge shown in FIG. 3;

FIG. 7 is a schematic partially in block form which is of a resistance bridge including a network the resistance of which varies in accordance with the stability of the resistance bridge;

FIG. 8 is a schematic of one embodiment of the resistance network shown in FIG. 7;

FIG. 9 is a schematic of a resistance bridge including a temperature sensitive device and means for calibrating the temperature sensitive device and the bridge;

FIG. 10 is a side elevational view of a temperature probe which can be used in conjunction with an electronic thermometer;

FIG. 11 is an enlarged plan view of one embodiment of a resistance chip which can be used in the temperature probe shown in FIG. 10;

FIG. 12 is a side elevational view of one embodiment of a probe sheath;

FIG. 13 is a fragmentary side elevational view of another embodiment of a temperature probe;

FIG. 14 is an enlarged plan view of a resistance chip which can be used in the probe shown in FIG. 13; and FIG. 15 is a schematic of a resistance bridge which can be used in conjunction with the resistance chip shown in FIG. 14.

DESCRIPTION OF PREFERRED EMBODIMENTS

The concept of this invention can be embodied in the configuration shown in FIG. 1 wherein a resistance bridge is shown generally at 11. The resistance bridge 11 comprises a first resistance branch 13 having a first resistance means 17 in series with a second resistance means 19. A second resistance branch 15 of the resistance bridge 11 includes a third resistance means 21 in series with a fourth resistance means 23. The first and second branches 13 and 15 and the resistance bridge 11 can be connected in parallel between a source of operating potential 25 and a reference potential, such as ground 27.

The first resistance means 17 typically has an unknown value which is to be determined. The first resistance means 17 can be a resistor having a fired resistance, or it can be a variable resistor the resistance of which fluctuates in accordance with an unknown parameter. In the illustrated embodiment, the first resistance means 17 is a temperature sensitive resistor. The second and third resistance means 19 and 21, respectively, are preferably resistors having fixed known values of resistance.

The fourth resistance means 23 can be a variable resistor having characteristics for being manually varied among known resistance values. The resistance range of the fourth resistance means 23 preferably includes a value which will enable the ratio of resistances in the first branch 13 to be equal to the ratio of resistance in the second branch 15. It is significant to note that the resistance means 17, 19, 21, and 23 can occupy any of the four positions in the resistance bridge 11 but preferably their resistance values are such that the resistance ratios in the first and second branches 13 and 15 can be equated.

The first and second branches 13 and 15 each have a common terminal 29 and 31, respectively, between the resistance means 17, 19, 21, and 23 in each of the branches 13, 15. It is well known to those in the art that when the voltages on the common terminals 29 and 31 are equal, the ratio of the resistances in the first branch 13 is equal the ratio of the resistances in the second branch 15.

This theory is expressed by the following formala:

$R_1/R_2 = R_4/R_3$
if and only if $e_2 = e_1$ where
- $R_1$ is the resistance means in branch 13 which is connected to the reference potential 27,
- $R_2$ is the resistance means in branch 13 which is connected to the operating potential 25,
- $R_3$ is the resistance means in branch 15 which is connected to the operating potential 25,
- $R_4$ is the resistance means in branch 15 which is connected to the reference potential 27,
- $e_1$ is the voltage on the common terminal 29, and
- $e_2$ is the voltage on the common terminal 31.

It can be appreciated that by varying the fourth resistance means 23 until the voltages on the common terminal 29 and 31 are equal, the unknown resistance of the first resistance means 17 can be computed. Furthermore, where the resistance of the first resistance means 17 varies in some known manner with an unknown parameter, the value of the parameter can be determined. For example, in the preferred embodiment, wherein the first resistance means 17 comprises a temperature sensitive resistor, the temperature of the first resistance means 17 can be determined when the voltages on the common terminals 29 and 31 are equal.

A means for comparing the voltages on the common terminals 29 and 31 can include a differential operational amplifier 33. The differential operational amplifier 33 is typically provided with a first input terminal 35 connected to the common terminal 29 and a second input terminal 37 connected to the common terminal 31. Typically, the differential operational amplifier 33 also will be connected between a source of positive operating potential 38 and a source of negative operating potential 40.

The differential operational amplifier 33 also can be provided with an output terminal 39, having a signal thereon with voltage characteristics which vary in proportion to the difference in the voltages of the first and second input terminals 35 and 37. In other words, the voltage on the output terminal 39 varies in accordance with the following formula:

$$E_0 = K(e_1 - e_2)$$

where
- $E_0$ is the voltage on the output terminal 39
- $e_1$ is the voltage on the first input terminal 35
- $e_2$ is the voltage on the second input terminal 37, and
- $K$ is some constant.

Thus, if the voltage on the first input terminal 35 rises, the voltage on the output terminal 39 also rises. In contradistinction, a rise in voltage on the second input terminal 37 results in a lowering of the voltage on the output terminal 39. Since the differential operational amplifier 33 amplifies the difference in the voltages on the common terminals 29 and 31, the degree of accuracy in the temperature calculations depends primarily upon the fidelity of the temperature to $R_1$ relationship and the stability and common mode rejection of the differential operational amplifier 33.

In operation, the fourth resistance means 23 can be varied among known values until the voltage on the output terminal 39 achieves a zero potential. This signifies that the voltages on the common terminals 29 and 31 are equal. With this condition fulfilled, the resistance of the first resistance means 17 would be directly proportional to the known resistances of the second and fourth resistance means 19 and 23, and inversely proportional to the known resistance of the third resistance means 21. In the preferred embodiment, the second and third resistance means 19 and 21, respectively, are provided with equal resistance values so that the resistance of the first resistance means 17 varies only with the known resistance of the fourth resistance means 23.

A second embodiment of the invention is shown schematically in FIG. 2. Of significant importance is the fact that the output terminal 39 of the differential operational amplifier 33 is connected to the common terminal between the second and third resistance means 19 and 21. In this manner, the signal on the output terminal 39 can be fed back to the first and second branches 13 and 15, respectively.

An indicating means 41 can be connected between the output terminal 39 of the differential operational amplifier 33 and the source of operating potential 25. It is desirable that the indicating means 41 have properties for isolating the source of operating potential 25 from the output of the differential operational amplifier 33 so that the voltage introduced to the branches 13 and 15 can fluctuate in accordance with the voltages on the first and second input terminals 35 and 37, respectively. The indication means 41 can provide a first visual indication to signal the saturated state of the amplifier 33 and a second visual indication to signal the unsaturated state of the amplifier 33.

The connection of the output terminal 39 of the differential operational amplifier 33 to the branches 13 and 15 provides significant advantages to the resistance bridge 11. It is apparent that as the voltage on the output terminal 39 rises, the voltages across the second and third resistance means 19 and 21 also rises. However, if the ratio of resistances in the first branch 13 is greater than the ratio of resistance in the second branch 15 (i.e., $R_1R_2 > R_4/R_3$), a rise in voltage on the output terminal 39 may cause the voltage across the first resistance means 17 to rise more rapidly than the voltage across the fourth resistance means 23. In other words, the voltage $e_1$ on the first input terminal 35 of the differential operational amplifier 33 will increase at a faster rate than the voltage $e_2$ on the second input terminal 37. These conditions will cause the voltage on the output terminal 39 to rise even further so that a condition of instability can be encountered. As long as the values of resistance remain as indicated, the voltage on the output terminal 39 will continue to rise until the differential operational amplifier 33 saturates, at which point the output terminal 39 will maintian a voltage approximately that of the source of operating potential 38.

In contradistinction, if the ratio of resistance in the first branch 13 is less than the ratio of resistances in the second branch 15 (i.e., $R_1/R_2 < R_4/R_3$), a rise in voltage on the ouput terminal 39 may cause the voltage across the first resistance means 17 to rise less rapidly than the voltage across the fourth resistance means 23. In other words, the voltage $e_2$ on the second input terminal 37 would rise at a faster rate than the voltage $e_1$ on the first input terminal 35. Under these conditions the voltage on the output terminal 39 will fall so that a condition of stability can be achieved.

Thus, by merely sensing the stability of the resistance bridge 11, one can determine the point at which the ratio of resistances in the first branch 13 becomes equal to the ratio of resistances in the second branch 15 (i.e., $R_1/R_2 = R_4/R_3$). This condition of stability is essentially an on-off condition; the bridge 11 is either stable or unstable. There are no degrees of stability to provide lesser or greater indications depending on the magnitude of the difference in the resistance ratios. Thus, the same high voltage indication will be provided whether the resistance ratio in the first branch 13 exceeds the resistance ratio in the second branch 15 by a great or a small amount. In this manner the differential operational amplifier 33 and the connection of its output terminal 39 to provide the source of operating potential 25 can provide an extremely sensitive and accurate means for determining the point at which the resistance calculations should be made.

From the foregoing discussion it is apparent that the stability of the resistance bridge 11 depends upon the relative values of the resistance means 17, 19, 21, and 23 in the resistance bridge 11. To achieve stability the ratio of resistances must be such that the voltage $e_2$ on the second input terminal 37 is greater than the voltage $e_1$ on the first input terminal 35. This condition of stability can be related directly to the resistance values though the following computations:

$$e_1 < e_2$$

$$E_o \frac{R_1}{R_1 + R_2} < E_o \frac{R_4}{R_3 + R_4}$$

$$R_1 R_3 < R_2 R_4$$

where $e_1$ is the voltage on the first input terminal 35 $e_2$ is the voltage on the second input terminal 37 $E_o$ is the output voltage of the differential operational amplifier 33

$R_1$ is the first resistance means 17 $R_2$ is the second resistance means 19 $R_3$ is the third resistance means 21, and $R_4$ is the fourth resistance means 23.

If the second and third resistance means 19 and 21 are provided with the same resistance value, the condition for stability can be reduced to $R_1 < R_4$. In other words, if the second and third resistance means 19 and 21 have equal resistance values, the bridge 11 will be in a stable condition if the first resistance means is less than the fourth resistance means. In the preferred embodiment, the second and third resistance means 19 and 21, respectively, are 1000 ohm resistors, and the first resistance means 17 is a temperature sensitive resistor whose resistance varies about a value of 1000 ohm. The resistance of the variable resistor comprising the fourth resistance means 23 also is variable about a value of 1000 ohms.

In operating the preferred embodiment of the bridge 11, the resistance of the fourth resistance means 23 can be decreased from a resistance higher than the resistance of the first resistance means 17. As long as the resistance of the fourth means 23 exceeds the resistance of the first means 17, the bridge 11 will remain stable. However, when the resistance of the fourth resistance means 23 is decreased below the resistance of the first resistance means 17, the resistance bridge 11 will become unstable and the saturation of the amplifier 33 will enable the second visual indication of the indicating means 41. The resistance of the fourth resistance means 23 can then be increased slightly until the first visual indication of the indicating means 41 signals the stability of the amplifier 33. At this point the resistance of the first and fourth resistance means 17 and 23 can be equated. It follows that if the first resistance means 17 is a temperature sensitive resistor, the variable resistor comprising the fourth resistance means 23 can be calibrated to reflect the temperature of the first resistance means 17.

FIG. 3 is an equivalent circuit of the resistance bridge 11 shown in FIG. 2. Of particular importance in the equivalent circuit is the offset voltage shown generally at 57. This offset voltage 57 accounts for all of the inequalities and imbalances associated with the differential operational amplifier 33. For example, this offset voltage 57 may vary from a predetermined value with temperature, age, and other ambient conditions.

In the following computations, $E_o$ is the voltage on the output terminal 39 of the differential operational amplifier 33
$K$ is the amplification of the amplifier 33
$e_1$ is the voltage on the first input terminal 35
$e_2$ is the voltage on the second input terminal 37
$e_{os}$ is the offset voltage 57
$R_1$ is the first resistance means 17
$R_2$ is the second resistance means 19
$R_3$ is the third resistance means 21
$R_4$ is the fourth resistance means 23
$\cong$ means "approximately equal"; and
$\rightarrow$ means "approaches in value".

$$E_o = K(e_1 + e_{os} - e_2)$$

It will be appreciated by those skilled in the art that the following formula can be derived wherein $e_1$ and $e_2$ are a function of $E_o$.

$$e_1 = \frac{E_o R_1}{R_1 + R_2}$$

$$e_2 = \frac{E_o R_4}{R_3 + R_4}$$

By substituting these formulae in the preceding formula for $E_o$, it can be shown that $$E_o = \frac{e_{os}}{\frac{1}{K} + \frac{1 - \frac{R_1}{R_2} \frac{R_3}{R_4}}{\frac{R_1 R_3}{R_2 R_4} + \frac{R_1}{R_2} + \frac{R_3}{R_4} + 1}}$$

If the values of resistance are chosen that $$R_1 \cong R_2, R_3 \cong R_4 \text{ and } \frac{R_1 R_3}{R_2 R_4} \rightarrow 1$$

Then, $$E_o = \frac{e_{os}}{\frac{1}{K} + \frac{1 - \frac{R_1}{R_2} \frac{R_3}{R_4}}{4}}$$

As noted previously, at the point where bridge 11 passes from stability to instability, the voltages on the first and second input terminals 35 and 37, respectively, will be substantially equal, that is, $$\frac{R_1}{R_2} \cong \frac{R_4}{R_3}.$$

Under this condition $$\left[1 - \frac{R_1}{R_2}\frac{R_3}{R_4}\right] \to 0,$$

and the above formula for $E_o$ reduces to $$E_o \cong K e_{os}$$

Preferred values can be substituted in this formula by letting $e_{os} = 25$ microvolts and $K = 5 \times 10^5$. Then, $$E_o = 5 \times 10^5 \times 25 \times 10^{-6} = 12.5 \text{ volts}$$

But the amplifier 33 will typically saturate with a voltage on output terminal 39 $\cong$ 5 volts, so $E_o$ may actually clamp at $E_o \cong 5$ volts in the saturated state.

Now consider a case when the bridge is stable but almost balanced; for example, assume that $$\frac{R_1}{R_2}\frac{R_3}{R_4} = 0.999;$$

then $$E_o \cong \frac{25 \times 10^{-6}}{\frac{1}{5 \times 10^5} + \frac{1-0.999}{4}} \cong 0.1 \text{ volts}$$

It follows that for $$\frac{R_1}{R_2}\frac{R_3}{R_4}$$

much less than 1, $E_o$ will be even smaller.

In summary, when $$\frac{R_1}{R_2} < \frac{R_4}{R_3},$$

the amplifier 33 will be stable and the voltage on output terminal 39 may have a relatively small magnitude such as 0.1 volts. On the other hand, when $$\frac{R_1}{R_2} > \frac{R_4}{R_3},$$

the amplifier 33 will be saturated and the voltage on output terminal 39 may have a relatively large magnitude such as 5 volts. At the point where the value of $$\frac{R_1}{R_2}$$

passes beyond the value of $$\frac{R_4}{R_3},$$

the voltage on output terminal 39 of amplifier 33 rises sharply and continuously from the relatively low voltage to the relatively high voltage.

In these calculations, the offset voltage $e_{os}$ of the amplifier 33 was chosen to be 25 microvolts. Actually, the offset voltage $e_{os}$ has a predetermined value from which the offset voltage may vary plus or minus 10 microvolts with temperature, age, and other ambient conditions. If the offset voltage $e_{os}$ changes from a positive value to a negative value, the output voltage $E_o$ at the point of saturation when $E_o = K e_{os}$ will have a relative large negative value. Although the bridge 11 would operate substantially as described under these circumstances, the indicating means 41 can be simplified if the output potential can be assumed to be either positive or negative but not both. For this reason, the offset voltage $e_{os}$ is preferably set as a predetermined value, such as +25 microvolts, so that the value of $e_{os}$ can retain a positive value even with a variation of $-10$ microvolts. In order to set the predetermined value of $e_{os}$, a potentiometer 42 can be connected across the amplifier 33 and center tapped to a positive reference potential 44.

As shown in FIG. 4, the indicating means 41 can comprise a light-emitting unidirectional member 43 and an electron-emitting device 45 connected in series between the source of operating potential 25 and the reference potential, such as ground 27. In the predetermined value of the offset voltage $e_{os}$ is set so that the output potential $E_o$ will be positive when the amplifier 33 is saturated, the electron-emitting device 45 can be an NPN transistor having a collector 47, an emitter 49, and a base 51. The emitter 49 can be connected through a resistor 52 to the reference potential, such as ground 27, and the base 51 can be connected to the output terminal 39 of the differential operational amplifier 33. The unidirectional member 43 can be a light-emitting diode having an anode 53 connected to the source of operating potential 25 and a cathode 55 connected to the collector 47 of the transistor 45. In this configuration, the value of the resistor 52 can be chosen to provide the light-emitting diode 43 with the desired brightness.

As the differential operational amplifier 33 becomes unstable, the voltage on its output terminal 39 rises rapidly and continuously to the point of saturation. In response to the relatively high saturation voltage, the transistor 45 conducts and the light-emitting diode 43 illuminates to provide the second visual indication and signal the saturation of the amplifier 33. When the resistance bridge 11 is in a stable condition, the voltage on the output conductor 39 will have the relatively low value so that the transistor 45 will not conduct. It follows that the light-emitting diode 43 will not illuminate thereby providing the first visual indication to signal the stability of the bridge 11.

A significant advantage of the present invention is associated with the exceptionally low current drain of the bridge 11 during conditions of stability. This can be accounted for in part by the fact that the voltage $E_o$ on output terminal 39 provides a source of operating potential for the resistance branches 13 and 15. Since the voltage on the output terminal 29 has a relatively low value when the bridge is in a stable condition, the magnitude of the current flowing through the resistance branches 13 and 15 at that time is exceptionally low.

A high voltage may be desirable however when the resistance ratios approach equality since that is the time when minute adjustments are made. It is significant to note that the relatively high voltage first appears on the output terminal 39 at the point when the resistance ratios approach equality. Thus, the differential operational amplifier 33 provides a means for reducing the current during less critical periods of adjustment and increasing the current when it is most advantageous.

The current drain of the apparatus is also dependent on the condition of the light-emitting diode 43. When the diode 43 is illuminated, the current drain is approximately 30 milliamperes, and when the diode 43 is not conducting, the current drain is approximately 0.1 microamperes. It follows that the apparatus draws 30 milliamperes in the unstable state and 0.1 microamperes in the stable state. This has a significant effect on the preferred method of operation of the bridge 11.

The resistance bridge 11 is preferably operated by starting from the low power stable state where the resistance of the fourth resistance means 23 is greater than the resistance of the first resistance means 17. Then the resistance of the fourth resistance means 23 is decreased until the light-emitting diode 43 illuminates. This will signify the condition of instability. The resistance of the fourth resistance means 23 is then increased until the light on the light-emitting diode 43 goes off. At this point the resistance of the first resistance means 17 can be equated to the resistance of the fourth resistance means 23.

This method of operation is preferable since the resistance bridge 11 is in a high current state for a minimum amount of time. Furthermore, during periods of nonuse, the resistance bridge is in a low current state rather than a high current state.

The low current drain of this apparatus is of particular advantage when incorporated into an electronic thermometer. Whereas batteries in the prior electronic thermometer have typically required charging after the measurement of only 50 temperatures, the current drain of this apparatus is low enough that as many as 10,000 temperatures may be taken without recharging the batteries.

It is conceivable that the resistance of the temperature sensitive resistor 17 will change only slightly over the temperature range to be measured. Thus, in the preferred embodiment, the temperature sensitive resistor 17 may be 1000 ohms at 90° F and only 1043 ohms at 110° F. In such an embodiment the resistance of the fourth resistance means 23 need only be capable of variations within the second resistance branch 15, which are proportional to the variations of the first resistance means 17 in the first resistance branch 13. In the preferred embodiment, where the second and third resistance means 19 and 21, respectively, are of equal value, the fourth resistance means 23 need only be capable of resistance variations equal to those of the first resistance means 17.

For example, the fourth resistance means 23 may comprise a fixed resistor 59 having a value of 1000 ohms and a variable resistor such as the potentiometer 61 having a maximum value of 43 ohms as shown in FIG. 4. This embodiment provides a high degree of accuracy since the potentiometer 61 varies only 43 ohms over the full displacement of its wiper. Therefore, it offers a much higher degree of accuracy than would a single 1000 ohm potentiometer which would vary 43 ohms over only a small segment of its wiper displacement.

In situations where the high cost of accurate low impedance potentiometers cannot be tolerated, the fourth resistance means 23 can comprise a high impedance fifth resistance means 63 in parallel with a resistor 64 having a fixed resistance. In this embodiment the resistor 64 can have a value of 44 ohms and the fifth resistance means can comprise a 2000 ohm potentiometer. It will be appreciated by those skilled in the art that adjustment of the 2000 ohm potentiometer will vary the impedance of the parallel combination in a nonlinearly manner substantially between zero and 43 ohms. In some cases, the fifth resistance means might be designed to be highly nonlinear so that most of the potentiometer wiper travel would be over the low resistance values.

In a further embodiment of the fourth resistance means 23, the fixed resistor 59 can be connected in parallel with the series combination of the variable resistor 63 and the fixed resistor 64. The fixed resistors 59 and 64 can have values of 1329 ohms and 4043 ohms, respectively, and the variable resistor 63 can have resistance values between 0 and 808 ohms. It will be appreciated by those skilled in the art that adjustment of the variable resistor 210 will vary the impedance of the fourth resistance means 23 in a nonlinear manner substantially between 1000 and 1043 ohms.

Potentiometers having a 1000 ohm range of resistance are much less expensive for a given accuracy and resolution than potentiometers having a range of resistance of only 43 ohms. For this reason the embodiment shown in FIGS. 5 and 5A would be less expensive to produce than the embodiment shown in FIG. 4. A higher range potentiometer also provides finer variations in resistance since the wire used therein typically has a smaller diameter which permits closer spacing of the turns of wire in the potentiometer.

The embodiments of FIGS. 4, 5, and 5A for varying the fourth resistance means 23 have shortcomings beyond those already noted. Potentiometers typically have a fixed resistance called the "end resistance" in series with a variable resistance. The end resistance though fixed is relatively uncontrollable, so in high accuracy applications, it is desirable to compensate for the variation in end resistance from one potentiometer to another.

Furthermore, a means can be provided in the resistance bridge 11 to compensate for manufacturing tolerances in the components comprising the instrument. In a linear instrument, two adjustments will suffice, one to adjust the "zero" or lowest instrument reading and one to adjust the "span" or the slope of the reading. In the embodiment of FIG. 5, the zero can be adjusted with another potentiometer in series with potentiometer 61, and the span can be adjusted by altering the resistance of potentiometer 61 itself, as for example, by placing another potentiometer in parallel with potentiometer 61. This approach for span adjust is satisfactory for some applications, but it can be appreciated by those skilled in the art that such a technique for span adjustment makes the effect of varying potentiometer 61 nonlinear.

Last, it was noted that the use of a small value potentiometer, such as potentiometer 61, sacrifices accuracy or cost. A more difficult situation exists when the fourth resistance means 23 is to be mechanized electronically. It is desirable that a means for impedance matching be provided, a means which can mechanize the fourth resistance means 23 at a resistance value appropriate to the hardware used and which can provide small variations in the fourth resistance means 23, such as 43 ohms.

Further embodiments of this invention include means for varying the fourth resistance means 23 in a linear manner, and means for calibrating the resistance bridge which does not affect the linearity of the resistance variations. A second differential operational amplifier 65 having a first input terminal 67, a second input terminal 69 and an output terminal 71 can be provided with a source of positive and negative operating potential 68 and 70. The resistor 59 can be connected to the first input terminal 67 and a seventh resistance means 73 can be connected between the second input terminal 69 and the reference potential 27. In the preferred embodiment the fifth resistance means 63 is connected between the first input terminal 67 and the output terminal 71 to form a first resistance leg 72 with the fixed resistor 59. In like manner a sixth resistance means 75 is connected between the second input terminal 69 and the output terminal 71 to form a second resistance leg 74 with the seventh resistance means 73. An equivalent offset voltage $e_{os2}$ of differential operational amplifier 65 is designated by the reference numeral 212. The negative terminal of the offset voltage 212 can be effectively tied to the junction of resistance means 75 and 73 while the positive terminal of the offset voltage 212 is tied to the second input terminal 69. It will be noted that the association of the first and second resistance legs 72 and 74, respectively, the second differential operational amplifier 65 corresponds to the association of the first and second resistance branches 15 and 13, respectively, with the first differential operational amplifier 33.

With reference to the following calculations, it will be appreciated by those skilled in the art that the resistance between the first input terminal 67 and the reference potential, such as ground 27, varies negatively in direct proportion to The resistance of the seventh resistance means 73 and the fifth resistance means 63, and in inverse proportion to the resistance of the sixth resistance means 75.

In the following calculations, $e_o$ is the offset voltage of the second differential operational amplifier 65

$e_1$ is the potential on the first input terminal 67

$e_2$ is the potential on the second input terminal 69

$e_3$ is the potential on the output terminal 71

$R \downarrow$ is the equivalent resistance looking out of the fixed resistor 59 in the direction of the second differential operational amplifier 65

$R \uparrow$ is the equivalent resistance looking into the fixed resistor 59 in the direction of the first differential operational amplifier 33

$R_5$ is the fifth resistance means 63

$R_6$ is the sixth resistance means 75

$R_7$ is the seventh resistance means 73

I is the current passing through the fifth resistance means 63, $K_2$ is the gain of the second differential operational amplifier 65, and $e_{os2}$ is the offset voltage 212 of differential operational amplifier 65.

It will be appreciated by those skilled in the art that $$R \downarrow = \frac{e_1 \text{ (open circuit)}}{I \text{ (short circuit)}}$$

To calculate $e_1$ (open circuit) the potentials $e_1$, $e_2$, and $e_3$ can be expressed as follows:

$$e_1 = \frac{R \uparrow}{R \uparrow + R_5} e_3, \quad e_2 = \frac{R_7}{R_7 + R_6} e_3$$

$$e_3 = K_2(e_2 - e_1) + K_2 e_{os2}$$

Substituting the equations for $e_1$ and $e_2$ into the equation for $e_3$ it can be shown that $$\frac{e_3}{e_{os2}} = \frac{K_2}{1 + K_2 \frac{R \uparrow}{R \uparrow + R_5} - \frac{R_7}{R_7 + R_6}}$$

but $$e_3 = \frac{e_1 \left( R \uparrow + R_5 \right)}{R \uparrow}$$

so that $$\frac{e_1}{e_{os2}} = \frac{+R \uparrow}{R \uparrow + \frac{R \uparrow + R_5}{K_2} - \frac{R_7 \left( R \uparrow + R_5 \right)}{R_6 + R_7}}$$

To obtain the open circuit voltage for $e_1$, let $R \uparrow$ approach infinity, then $$e_1 \text{ (open circuit)} = \frac{K_2 e_{os2}}{1 + K_2 \frac{R_6}{R_6 + R_7}}$$

and since 1 is much less than $$K_2 \frac{R_6}{R_6 + R_7} \text{ for a large } K_2,$$

$$e_1 \text{ (open circuit)} = \frac{R_6 + R_7}{R_6} e_{os2}$$

The short circuit current can be derived by expanding the previous equation for $e_3/e_{os2}$ so that $$\frac{e_3}{e_{os2}} = \frac{+K_2 \left( R \uparrow + R_5 \right)(R_6 + R_7)}{\left( R \uparrow + R_5 \right)(R_6 + R_7) + K_2 \left( R \uparrow R_6 - R_5 R_7 \right)}$$

It can also be appreciated that $$I = \frac{e_3}{R \uparrow + R_5}$$

and it follows that $$I = \frac{+e_{os2} K_2(R_6 + R_7)}{\left(R\uparrow + R_5\right)(R_6 + R_7) + K_2\left(R\uparrow R_6 - R_5 R_7\right)}$$

To obtain the short circuit current, let $R\uparrow$ approach zero, then $$I \text{ (short circuit)} = \frac{+e_{os2} K_2(R_6 + R_7)}{R_5(R_6 + R_7) - K_2(R_5 R_7)}$$

Dividing the expression for $e_1$ (open circuit) by the expression for I(short circuit), it can be shown that $$R\downarrow = \frac{e_1 \text{ (open circuit)}}{I \text{ (short circuit)}} = -\frac{R_5 R_7}{R_6 + \frac{R_6 + R_7}{K_2}} + \frac{R_5}{1 + \frac{K_2 R_6}{R_6 + R_7}}$$

Since $K_2$ may be of a magnitude greater than 500,000, the second portion of the preceding formula will be substantially zero so that the expression reduces to $$R\downarrow = -\frac{R_5 R_7}{R_6}$$

With reference to this formula it can be seen that the second differential operational amplifier 65 provides a circuit the resistance of which varies increasingly negative with successive additions of resistance to the fifth resistance means 63. Thus, by adding resistance to a portion of the fourth resistance means 23, the total resistance of the fourth resistance means actually decreases. This advantage was unexpected since the addition of a quantity typically increases rather than decreases the total amount of that quantity.

In one embodiment of this invention, the sixth and seventh resistance means 75 and 73, respectively, are fixed resistors having values of 5000 ohms and 75 ohms, respectively. The fifth resistance means 63 can be a potentiometer providing variations in resistance between 0 and 2000 ohms.

In the preferred embodiment where the first resistance means 17 varies between 1000 ohms and 1043 ohms, the resistor 59 is provided with a value of 1043 ohms. Since the resistance at the first input terminal 67 can be varied between 0 and −43 ohms, it is apparent that the total resistance of the fourth resistance means 23 will vary between the desired range of 1000 and 1043 ohms.

With reference to the formula for $R\downarrow$, it is apparent that the fifth resistance means 63 can be held constant, and the sixth resistance means 75 can be controlled to provide resistance variations in the fourth resistance means 23. Such an embodiment will present one difference, however, the resistance variations in the sixth resistance means 75 will cause $R\downarrow$ to vary decreasingly negative with successive additions of resistance to the sixth resistance means 75.

Variations of the sixth resistance means 75 can be accomplished automatically as shown in FIG. 7 wherein the sixth resistance means 75 includes a resistance network 76. The output terminal 39 of the first differential operational amplifier 33 can be logically connected through a clock 80, a binary coded decimal counter 77, and a logic network 78 to the resistance network 76. A digital display 79 can be driven by each count of the counter 77 to provide a visual indication of a desired parameter such as resistance or temperature. The resistance network 76 can include a multiplicity of parallel branches each containing a fixed resistor, such as the resistors designated in FIG. 8 with successive odd numbers between 81 and 97, inclusive. In series with the fixed resistors 81–97, each resistance branch also can be provided with a switching means, such as the field effect transistors which are designated in FIG. 8 with successive odd numbers between 99 and 115, inclusive. Each of the field transistors 81–97 includes a gate which can be individually connected to the logic network 78.

The operation of the embodiment shown in FIGS. 7 and 8 can begin by closing a switch 84 to clear the counter 77 and start the clock 80. The clock 80 can continue to pulse and the counter 77 can continue to count until the relatively high voltage appears on the output terminal 39.

In response to each count of the counter 77, the logic network 78 will enable the field effect transistors 99–115 in combinations which provide the sixth resistance means 75 with a resistance such that the fourth resistance means 23 is in closer correspondence to the resistance of the temperature sensitive resistor 17. Thus, when the digital display 79 shows a temperature of 99.8° F, the logic network 78 will enable field effect transistors 99 and 115 so that the sixth resistance means 75 comprises the parallel combination of resistors 81 and 99. On the next count of the counter 77, the digital display 79 would display a temperature of 99.9° F and the logic network 78 would enable the field effect transistor 99. The following table further reflects the combinations of field effect transistors 99–115 which could be enabled by the logic network 79 to correspond to the temperature of the temperature sensitive resistor 17. The equivalent resistance of $R\downarrow$ and the fourth resistance means 23 ($R_{23}$) are also tabulated. The field effect transistors (FET) are designated on "on" with the number 1, and "off" with the number 0.

| Temperature (° F) | $R_L$ | $R_{23}$ | FET 99 | FET 101 | FET 103 | FET 105 | FET 107 | FET 109 | FET 111 | FET 113 | FET 115 |
|---|---|---|---|---|---|---|---|---|---|---|---|
| 90.0 | −43.55 | 1000.00 | 1 | 1 | 0 | 0 | 1 | 1 | 0 | 0 | 1 |
| 90.1 | −43.34 | 1000.22 | 1 | 1 | 0 | 0 | 1 | 1 | 0 | 0 | 0 |
| 90.2 | −43.12 | 1000.44 | 1 | 1 | 0 | 0 | 1 | 0 | 1 | 1 | 1 |
| 90.3 | −42.90 | 1000.66 | 1 | 1 | 0 | 0 | 1 | 0 | 1 | 1 | 0 |
| 90.4 | −42.68 | 1000.88 | 1 | 1 | 0 | 0 | 1 | 0 | 1 | 0 | 1 |
| 90.5 | −42.46 | 1001.10 | 1 | 1 | 0 | 0 | 1 | 0 | 1 | 0 | 0 |
| 90.6 | −42.24 | 1001.32 | 1 | 1 | 0 | 0 | 1 | 0 | 0 | 1 | 1 |
| 90.7 | −42.02 | 1001.54 | 1 | 1 | 0 | 0 | 1 | 0 | 0 | 1 | 0 |
| 90.8 | −41.80 | 1001.76 | 1 | 1 | 0 | 0 | 1 | 0 | 0 | 0 | 1 |
| 90.9 | −41.59 | 1001.97 | 1 | 1 | 0 | 0 | 1 | 0 | 0 | 0 | 0 |
| 91.0 | −41.37 | 1002.19 | 1 | 1 | 0 | 0 | 0 | 1 | 0 | 0 | 1 |
| 91.1 | −41.15 | 1002.41 | 1 | 1 | 0 | 0 | 0 | 1 | 0 | 0 | 0 |
| 91.9 | −39.40 | 1004.16 | 1 | 1 | 0 | 0 | 0 | 0 | 0 | 0 | 0 |

-continued

| Temperature (°F) | $R_L$ | $R_{23}$ | FET 99 | FET 101 | FET 103 | FET 105 | FET 107 | FET 109 | FET 111 | FET 113 | FET 115 |
|---|---|---|---|---|---|---|---|---|---|---|---|
| 92.0 | −39.18 | 1004.38 | 1 | 0 | 1 | 1 | 1 | 1 | 0 | 0 | 1 |
| 92.1 | −38.96 | 1004.60 | 1 | 0 | 1 | 1 | 1 | 1 | 0 | 0 | 0 |
| 99.8 | −22.11 | 1021.45 | 1 | 0 | 0 | 0 | 0 | 0 | 0 | 0 | 1 |
| 99.9 | −21.89 | 1021.67 | 1 | 0 | 0 | 0 | 0 | 0 | 0 | 0 | 0 |
| 100.0 | −21.67 | 1021.89 | 0 | 1 | 0 | 0 | 1 | 1 | 0 | 0 | 1 |
| 100.1 | −21.45 | 1022.11 | 0 | 1 | 0 | 0 | 1 | 1 | 0 | 0 | 0 |
| . | . | . | | | | | | | | | |
| 100.9 | −19.70 | 1023.86 | 0 | 1 | 0 | 0 | 1 | 0 | 0 | 0 | 0 |
| 101.0 | −19.48 | 1024.08 | 0 | 1 | 0 | 0 | 0 | 1 | 0 | 0 | 1 |
| . | . | . | | | | | | | | | |
| 109.8 | −0.22 | 1043.34 | 0 | 0 | 0 | 0 | 0 | 0 | 0 | 0 | 1 |
| 109.9 | −0.00 | 1043.56 | 0 | 0 | 0 | 0 | 0 | 0 | 0 | 0 | 0 |

In the preferred embodiment the resistors 81–97 are provided with the following values:

| Resistor No. | Resistance Value |
|---|---|
| 81 | 20,000 ohms |
| 83 | 25,000 ohms |
| 85 | 50,000 ohms |
| 87 | 100,000 ohms |
| 89 | 200,000 ohms |
| 91 | 250,000 ohms |
| 93 | 500,000 ohms |
| 95 | 1,000,000 ohms |
| 97 | 2,000,000 ohms |

The successive combinations of the resistors 81–97 can affect the resistance of the sixth resistance means 75 in accordance with the well-known formula for parallel resistance combinations:

$$\frac{1}{R_T} = \frac{1}{R_1} + \frac{1}{R_2} + \frac{1}{R_3} \ldots + \frac{1}{R_n}$$

where $R_T$ is the total resistance of the sixth resistance means 75

$R_1$ is the resistance of the resistor 81, $R_2$ is the resistance of the resistor 83,

.
.
.

$R_8$ is the resistance of the resistor 96, and $R_9$ is the resistance of the resistor 97.

It can be seen from this formula that the lower value resistors, such as the resistor 81, decrease the total resistance of the sixth resistance means 75 to a greater extent than do the higher value resistors, such as resistor 97. This being the case, the resistors 91 through 97 can determine the least significant digit of the measured temperature, the resistors 83 through 89 can determine the more significant digit, and the resistor 81 can determine the most significant digit.

It is well known that field effect transistors are accompanied by sizeable series resistances which may be as high as 500 ohms. Since these resistances vary with each field effect transistor, it is desirable to minimize their effect. This has been accomplished in the preferred embodiment by providing each of the resistors 81–97 with a high resistance value so that the series resistance of the field effect transistor in each branch is relatively small in comparison to the resistance of the resistor in that branch.

Typically, the higher quality field effect transistors have a lower series resistance but they are also more expensive. Since the preferred resistance values of resistors 81 and 83 are lower than the values of the other resistors in the resistance network 76, high-quality field effect transistors are preferably provided in the branches containing these resistors. In the other branches which have relatively higher resistance values, less expensive field-effect transistors having higher series resistance values can be used.

Preferably, the counting by the counter 77 and the resulting enabling of field-effect transistors by the logic network 78 will continue until the resistance of the fourth resistance means 23 is equal to the resistance of the temperature sensitive resistor 17 at which point the output terminal 33 of the first differential operational amplifier 33 will achieve a zero voltage. When a zero voltage appears on the output terminal 39, the counter 77 will cease counting and the number on the digital display 79 will reflect the temperature of the temperature-sensitive resistor 17. Thus, the successive combinations of the resistors 81–97 will eventually stabilize the first differential operational amplifier 33 at which point the temperature will be automatically displayed.

In another embodiment the counter 77 can be initialized at full scale corresponding to 109.9° F, from which point the counter 77 can count down until resistance means 23 balances resistance means 17. This embodiment has the advantage that the differential operational amplifiers operate in the stable state, and hence in the low power state, until the first and fourth resistance means 17 and 23, respectively, reach the point of equality. In this embodiment, it may be desirable to provide logic for opening all of the FET switches 99 to 115 at the point of equality without changing the state of the counter 77 or the digital display 79. In this way, the operational amplifiers 33 and 65 can be returned to their low-power stable state without losing the information displayed by the digital display 79.

In the preferred embodiment, the digital display 79 includes a switch 82 which can be manually operated to illuminate the presentation of the display 79. In this embodiment, the digital display 79 does not indicate the state of the counter 77 until commanded to do so by operation of the switch 82. The advantage is twofold. First, power is consumed by the display only when the switch is operated, and second, the temperature reading can be kept private by the medical authority taking the temperatures of the patient. As an alternative, means can be provided to turn on the display 79 for only a limited interval, such as one second. This feature also minimizes power drain.

It will be appreciated by those skilled in the art that the digital counter 79 also can be connected logically to the output terminal 71 of the second differential operational amplifier 65 since first and second differential operational amplifiers will become unstable at the same time. The instability of the first and second differential operational amplifiers 35 and 65, respectively, is proved to be simultaneous in the following calculations.

Since the configuration of the components associated with first differential operational amplifier 33 is the mirror image of the configuration of the components associated with the second differential operational amplifier 65, the foregoing analysis used to derive $R\downarrow$ can be made to show that $$R\uparrow = -\frac{R_1 R_3}{R_2}$$

where
$R\uparrow$ is the equivalent resistance looking into the fixed resistor 59 in the direction of the first differential operational amplifier 33
$R_1$ is the first resistance means
$R_2$ is the second resistance means, and
$R_3$ is the third resistance means.
It has been shown that the first differential operational amplifier 33 will be unstable when $$\frac{R_1}{R_2} > \frac{R\downarrow}{R_3}$$

Substituting the previously derived formula for $R\downarrow$, it can be shown that $$\frac{R_7}{R_6} > \frac{1}{R_3}\left[-\frac{R_1 R_3}{R_2}\right]$$

but $-\frac{R_1 R_3}{R_2} = R\uparrow$ so that, as expected, $$\frac{R_7}{R_6} > \frac{R}{R_3}$$

This formula will be recognized as the condition for instability of the circuit associated with the second differential operational amplifier 65.

In FIG. 9 the resistance bridge 11 is shown with connectors 117, 119, 121, 201, 202, and 203, which could be used to separate a probe assembly 123 from a temperature calculating circuit 125. The circuit shown in FIG. 7 is electrically similar to the circuit shown in FIG. 9 except for the provision of two variable resistors 127 and 129 in the probe assembly 123 and two variable resistors 131 and 133 in the temperature calculating circuit 125. These variable resistors 127, 129, 131, and 133 provide means for calibrating the probe assembly 123 and the temperature calculating circuit 125.

When the probe assemblies 123 are manufactured, they can be individually connected to a standard temperature calculating instrument (not shown). The variable resistor 127 can then be adjusted to reflect a temperature of 90° F (the zero adjust) and the variable resistor 129 can be adjusted to reflect a temperature of 110° F (the span adjust). When the temperature calculating circuits 125 are manufactured, they can be individually connected to a standard probe assembly (not shown). Thus connected, the variable resistor 131 can be adjusted to reflect a temperature of 90° F (the zero adjust) and the variable resistor 133 can be adjusted to reflect a temperature of 110° F (the span adjust).

A probe assembly 123, such as that shown in FIG. 10, can consist of a probe shown generally at 135 and an adjustment network 137 consisting primarily of the variable resistors 127 and 129. The probe 135 includes a cylinder 139 at one end of which is mounted the indicating means such as the light emitting diode 43. The opposite end of the cylinder 139 can include the first resistance means, such as the temperature sensitive resistor 17. The primary purpose of the cylinder 139 is to provide support for the temperature sensitive resistor 17 which in operation is held in proximity to the tissue in the mount of a patient. The temperature sensitive resistor 17 is connected to the adjustment network 137 by wires 141, which preferably are disposed to enter the probe 135 in proximity to the light emitting diode 43 and to contact the temperature sensitive resistor 17 internally of the cylinder 139. The cylinder 139 can be formed from many plastics such as acrylonitrile-butadiene-styrene.

The temperature sensitive resistor 17 includes a resistance chip 142 on which is disposed a thin film 146 of temperature sensitive material such as platinum. Platinum offers particular advantages to the invention as disclosed herein, and compared to the other metals, semiconductors, or thermistors presently in use with electronic thermometers. Platinum combines only with difficulty with the other elements and will remain in its pristene state indefinitely. Platinum can be annealed at a high temperature, typically 550° C, and after annealing, temperature variations below 500° C cause no appreciable change in its temperature coefficient of resistance (TCR). Platinum is readily available in an ultra pure state (99.99% pure) and its resistance and TCR are highly predictable and reproducible.

It is within the skill of those in the art to choose other metals for use in the temperature sensitive resistor 17. For example, metals such as nickel, chromium, and titanium may be useful and more economical.

The prior art has shown that the resistance across a square of thin film material such as platinum will be dependent upon the material comprising the film and will be relatively independent of the size of the square. For example, the resistance of a thin film of platinum deposited to a thickness of about 230 nanometers is 0.5 ohms per square. If the desired resistance of the resistance chip 142 is 1000 ohms and the width of the strip 146 is 0.0015 inches, as in the preferred embodiment, the length of the strip 146 can be computed to be approximately three inches. To accommodate this length, the thin strip 146 can be disposed in an approximate sinuous or helical configuration on the backing 144. Thus, the resistance chip 142 can be coated with a thin strip of platinum 0.0015 inches wide and three inches long to provide a temperature sensitive resistor of approximately 1000 ohms. Since the temperature coefficient of resistance of platinum is approximately 0.218 percent per degree Fahrenheit, it can be appreciated by those skilled in the art that the 1000 ohm platinum resistance chip 142 will increase approximately 43 ohms between the temperatures of 90° F and 110° F.

The resistance chip 142 can be oriented so that the strip 146 is disposed internally of the cylinder 139 facing toward the end of the probe containing the diode 43. This configuration is preferred since the backing 144 and the cylinder 139 shield the strip 146 to provide it with some degree of protection. With this orientation, however, a substantial amount of heat will pass through to backing 144 to reach the platinum strip 146. For this reason, the backing 144 is preferably constructed of a material having a high heat conductivity such as alumina, beryllia, oxide coated silicon, or sapphire. It is also desirable that the backing 144 have a smooth surface to permit greater control over the thickness of the strip 146. The smooth surface can be provided by grinding and polishing the backing 144. In the preferred embodiment the backing 144 has a diameter of 0.1 inches and a thickness of 0.005 inches.

The mass of the temperature sensitive resistor 17 may be of particular significance. As a matter of illustration it may be helpful to consider typical temperature occurring during the process.

Immediately prior to sensing the temperature of the patient, the resistance chip 142 and the cylinder 139 may be at a room temperature such as 70° F and the tissue may be at a temperature such as 100° F. When the resistance chip 142 is brought into contact with the tissue of the patient, the tissue heats the thin strip 146 on the resistance chip 142. It can be appreciated, however, that the resistance chip 142 and the cylinder 139 tend to cool the hotter tissue they contact. In this manner, the strip 146 and the tissue will achieve an initial temperature, such as 99° F, lower than the original temperature of the tissue, such as 100° F. As a result of blood circulationthe temperature of the tissue and the resistance chip 142 will rise during a regeneration period from the initial temperature to the accurate original temperature such as 100° F. It is desirable that this regeneration period be minimized in order that an accurate temperature can be sensed in as short a period of time as possible.

One of the primary factors affecting the regeneration time is the mass of the temperature sensitive resistor 17. As noted, the thermistors of the prior art have a relatively large mass and therefore a relatively long regeneration period such as two minutes. A particular advantage of the present invention is associated with the relatively small mass of the resistance chip 142. For example, the platinum strip 146 can be coated on the backing 144 to a thickness of less than 300 nanometers. Thus, the mass of the temperature sensitive resistor 17 can be limited so that the regeneration period is as short as 2 seconds.

A disposable sheath 143 having an open end 145 and a closed end 147 can be provided to slip over the resistance chip 144 on the end of the cylinder 139. When operably disposed, the closed end 147 of the sheath 143 is preferably in substantial contact with the resistance chip 144. To enable the resistance chip 142 to rapidly achieve the measured temperature, the thickness of the closed end 147 of the sheath 143 can be limited to 6 milliinches. This will aid in the rapid transfer of heat between the tissue and the resistance chip 144.

The sheath 143 is preferably constructed of inexpensive homogeneous materials having a relatively high thermal conductivity. For example, the sheath 143 can be constructed of a homogeneous plastic material such as polyethylene which has a relatively high thermal conductivity compared to other plastics. A filler 144 can be disposed interiorly of the sheath 143 at least between the closed end 147 and the temperature sensitive resistor 17. The filler 144 is preferably deformable and has a high thermal conductivity. For example, in the preferred embodiment, the filler 144 consists of slate flour. Both polyethylene and slate flour are readily available and inexpensive so the sheath 143 can be sold at a price sufficiently low to make it economically disposable. This is of significant advantage when the apparatus is used as an electronic thermometer to take the temperature of patients. By providing a disposable sheath 143, the probe 135 need not be sterilized each time it is used.

A second embodiment of the probe 135 having an even shorter regeneration period is shown in FIG. 13. In the embodiment, a first resistance chip 151 is mounted at the forward end of the cylinder 139. A second resistance chip 153 can be mounted on the cylinder 139 rearwardly of the first resistance chip 151 and spaced therefrom by a spacer 205 having a low thermal conductivity. The second resistance chip 153 can be thermally coupled to the plane of the first resistance chip 151 by an annulus 206. The annulus 206 can be formed of a high thermal conductivity material such as a metal, alumina, beryllia, silicon, or sapphire. In the preferred embodiment, the annulus 206 is in intimate contact with the sheath 147. The first plurality of wires 141 connect the second resistance chip 153 with the adjustment network 137. Portions of the second resistance chip 153 define a hole 155 therein to provide a second plurality of wires 207 with access to the first resistance chip 151.

In operation, as the first resistance chip receives heat from the tissue, additional heat is generated and applied to second resistance ship 153. In the preferred embodiment, the additional heat generated is sufficient to raise the temperature of the second chip 153 and the annulus 206 to the temperature of the first chip 151.

If the temperature of the first resistance chip 151 is equal to the temperature of the second resistance chip 153, there may be no flow of heat on wires 207 other than that necessary to satisfy their heat capacity. Additionally, if the annulus 206 is at the same temperature as the first resistance chip 151, there may be no flow of heat through the spacer 205 other than that necessary to satisfy its heat capacity. Furthermore, if the annulus 206 is in intimate contact with the sheath 147, the heat flow rearwardly of the first resistance chip 151 can be supplied by the annulus 206. The annulus 206 can be supplied heat by the second resistance chip 153. Similarly heat flow in the wires 141 and the cylinder 139 can be supplied by the second resistance chip 153. This being the case, the desired conclusion follows that the tissue need supply only enough heat to satisfy the thermal capacity of the first resistance chip 151 and part of the heat capacity of wires 141 and the spacer 205. In fact, the temperature sensitive resistor 17 on the first resistance chip 151 dissipates heat approximately proportional to the temperature change demanded by the tissue, so that heat drained from the tissue does not even supply all of the heat capacity noted above. This technique of thermally isolating the temperature sensing means 17 and of reducing its effective thermal capacity overcomes a major difficulty in prior electronic thermometers with regard to speed.

In this second embodiment of the probe 135, the first resistance chip 151 is similar to the resistance chip 142 in that it includes the backing 144 and the first temperature sensitive strip 146 coated thereon. In addition thereto, the first resistance chip 151 includes a second temperature sensitive strip 157 similar to the strip 146. The strips 146 and 157 can be simultaneously disposed on the backing 144 in substantially parallel helical configurations so that the beginning and end of each of the strips 146 and 157 can be connected to one of a plurality of pads 158 preferably disposed at the center of the backing 144. Such a configuration is shown in FIG. 14.

The second resistance chip 153 can be similar to the first resistance chip 151 with a pair of resistors 159 and 161 coated thereon. As previously noted, however, the diameter of the backing 144 is preferably sufficient to enable the second resistance chip 153 to contact the annulus 206. Also the pads 158 are preferably disposed at the circumference of the hole 155. The resistors 146, 157, and 159 are preferably temperature sensitive resistors manufactured in accordance with methods previously described. While the resistor 161 need not be temperature sensitive, it can be made by using the technology previously described as a matter of manufacturer's convenience.

In order to accomplish the foregoing objectives, the strips 157 and 159 can be connected in respective branches of a third resistance bridge such as those previously described. Such a bridge, shown generally at 163 in FIG. 15, includes a first branch 165 and a second branch 167. The bridge also includes one of a pair of fixed resistors 168 and 171 in each of the branches 165 and 167, respectively. A third differential operational amplifier 173 receives an input from the common terminal in each of the branches 165 and 167, and introduces an output signal to a terminal 175 common to the fixed resistors 168 and 171.

A current control member such as the transistor 177 is connected in series with the resistor 161 between the source of operating potential 25 and the reference potential 27. The transistor 177 responds to an output signal on terminal 175 by enabling current to pass through the resistor 161, and the second resistance chip 153 is thereby heated.

It can be appreciated that the temperature of the first resistance chip 151 including the strips 146 and 157 will be controlled by the temperature of the tissue. The temperature of the second resistance chip 153 including the strip 159, however, will be controlled by the temperature of resistor 161. Thus, the resistance of the temperature sensitive resistor 157 will correspond to the temperature of the first resistance chip 151, and the resistance of the temperature sensitive resistor 159 will correspond to the temperature of the second resistance chip 153.

In the third resistance bridge 163, the fixed resistors can have values providing substantially equal resistance ratios in each of the branches 165 and 167 when the temperature sensitive resistors 157 and 159 have substantially equal temperatures. Then, as the first resistance chip 151 is heated by the tissue, the resistance of the temperature sensitive resistor 157 increases and the resistance bridge 163 becomes unstable in a manner previously explained. During the period of instability, the transistor 177 enables current to pass through the resistor 161 whereby the second resistance chip 153 is heated. This causes the resistance of the temperature sensitive resistor 159 to rise until the resistance ratios in each of the branches 165 and 167 are equal. At this point the resistance bridge 163 becomes stable and the transistor 177 ceases to conduct. In this manner power to the resistor 161 is automatically controlled to raise the temperature of the second resistance chip 153 to the temperature of the first resistance chip 151.

It is particularly advantageous that the transistor 177 ceases to conduct when temperatures of the temperature sensitive resistors 157 and 159 are equal since the resistor 161 will also cease to heat the second resistance chip 153 at the same instant. This insures that the tissue is not heated beyond its original temperature.

In a further embodiment of the invention, the transistor 177 is eliminated from the third resistance bridge 163 and the resistor 161 is eliminated from second resistance chip 153. In this embodiment, current flowing through the temperature sensitive resistor 159 is relied upon to heat the second resistance chip 153. In order to maximize the heating capacity of the resistor 159, it is desirable that the resistors 159 and 171 have relatively low values so that a relatively large current flows through the resistor 159 during periods of instability. This will increase the heating characteristics of the temperature sensitive resistor 159.

By automatically generating heat within the probe 135 and thus thermally isolating resistance means 17, the regeneration period is substantially decreased. Thus, instead of relying on new heat from blood circulation, the probe 135 takes essentially no heat from the tissue and therefore does not substantially alter the temperature of the tissue. With essentially no regeneration period, an accurate temperature of the tissue can be sensed in a period less than one second.

The electronic thermometer disclosed herein offers significant advantages over the prior art. The resistance bridge 11 provides a means for detecting exceptionally small changes in resistance. It has characteristics which provide for the generation of a condition of instability of the point where the known value of the fourth resistance means 21 equals the unknown value of the first resistance means 17. The condition of instability can result in a high voltage output whether the difference in resistance values is great or small. The fourth resistance means 23 can comprise a series of resistance branches which can be automatically enabled to correspond to the temperature of the first resistance means.

The probe 135 also provides significant advantages over the prior art. In particular, the resistance chip 142 can have a low mass and can be thermally isolated from the sheath, wires, and support structure. This permits the resistance chip 142 to assume the temperature of its environment in a relatively short period of time. Whereas probes of the prior art have taken up to 15 seconds along with operating skill to achieve their ultimate temperature, the probe shown in FIG. 10 typically requires less than 1 second.

The probe 135 can be provided with temperature sensitive resistor comprising a platinum strip. Platinum is considerably more stable than the thermistors which are presently used in temperature probes and its resistance is much more predictable.

The sheath 143 can be constructed as a single piece, with inexpensive materials and a minimum of labor. Hence, the cost of its production and the ultimate price to the consumer can be relatively low in comparison to sheaths which are presently available. This will insure that the sheaths can be disposed of with each use thereby augmenting the use of the apparatus in a medical environment.

Although the concept of this invention has been discussed with relation to specific embodiments, other embodiments may be apparent to those or ordinary skill in the art. For this reason the inventive concept should be limited only by the scope of the appended claims.

I claim:

1. In combination for determining an unknown value of impedance, comprising:

first impedance means for providing the unknown value of impedance to be determined;

second impedance means for providing an impedance adjustable through a range of known values of impedance;

third impedance means providing a first particular value of impedance;

fourth impedance means providing a second particular value of impedance;

first connecting means coupling the first, second, third and fourth means in a bridge to form first and second impedance branches each including an individual pair of the first, second, third and fourth impedance means and each including a common terminal between the impedance means in that branch;

fifth means responsive to the voltage on the common terminal in the first impedance branch and the voltage on the common terminal in the second impedance branch for producing an output voltage representing any voltage difference between the voltages on such common terminals;

sixth means responsive to the output voltage from the fifth means for introducing such output voltage to the first and second impedance branches in a positive feedback to energize such impedance branches for the production, on the common terminal in the first impedance branch and the common terminal of the second impedance branch, of voltages having a first value for unbalances of a first particular amplitude in the relative values of the impedances in the first and second impedance branches and voltages having a second particular amplitude distinctively different from the first particular amplitude for unbalances of a second polarity in the relative values of the impedance in the first and second impedance branches;

the second means comprising:

fifth impedance means for providing a particular value of impedance;

sixth impedance means for providing a particular value of impedance;

seventh impedance means for providing a particular value of impedance;

eighth impedance means for providing an impedance adjustable through a range of known values of impedance;

second connecting means coupling the fifth, sixth, seventh and eighth impedance means to form third and fourth impedance branches each including an individual pair of the fifth, sixth, seventh and eighth impedance means and a common terminal between the impedance means in that branch;

ninth means responsive to the voltage on the common terminal in the third impedance branch and the voltage on the common terminal in the fourth impedance branch for producing an output voltage representing any voltage difference between the voltages on such common terminals; and tenth means responsive to the output voltage from the tenth means for introducing such output voltage to the third and fourth impedance branches to energize such impedance branches for controlling the production of the voltages on the common terminals in the third impedance branch and the common terminal in the fourth impedance branch in accordance with such output voltage.

2. The combination recited in claim 1 further comprising:

counting means responsive to the output signals from one of the fifth means and ninth means for providing periodic impulses until the relative impedances of the first, second, third, and fourth impedance means in the first and second impedance branches provide a change in the production of the voltages on the common terminals in the first and second impedance branches from a difference voltage of one polarity to a difference voltage of an opposite polarity;

actuating means responsive to the periodic impulses of the counting means for varying the impedance of the eighth impedance means in a particular relationship to provide a progressive variation in the impedance of the second impedance means; and display means responsive to the periodic impulses of the counting means for providing a visual display of the temperature at which the difference in the voltages on the common terminals in the first and second impedance branches changes from one polarity to an opposite polarity.

3. The combination recited in claim 2 wherein the actuating means comprises:

a plurality of impedance members interconnected to form an impedance network;

a plurality of switching means each connected to an associated one of the impedance members to control the introduction of the associated impedance member into the impedance network, each of the switching means having characteristics for being selectively activated to vary the impedance of the ninth impedance means in accordance with the value of the impedance of its associated impedance member; and logic means responsive to the periodic impulses of the counting means for selectively activating the plurality of switching means in a sequence of particular patterns to vary the impedance of the ninth impedance means progressively with successive impulses of the counting means so that the relationship of the first, second, and third, and fourth impedance means becomes progressively varied to provide a change in the difference in the voltages on the common terminals of the first and second impedance branches from one polarity to the opposite polarity.

4. The combination set forth in claim 1 wherein the fifth means and the ninth means have properties for providing the output signals of the fifth means and the ninth means with accelerating characteristics when the first impedance means has a particular known relationship with the second impedance means, and the combination further comprises:

indicating means responsive to the accelerating characteristics of the output signal of one of the fifth means and tenth means to provide a visual indication when the difference in the voltages on the common terminal in the first and second impedance branches changes from one polarity to an opposite polarity.

5. The combination set forth in claim 4 wherein the indicating means comprises:
an unidirectional member having properties for becoming illuminated in response to a flow of current through the unidirectional member; and
current control means responsive to the accelerating characteristics of one of the output signals of the fifth means and the tenth means for providing a flow of current through the unidirectional member to illuminate the unidirectional member.

6. The combination set forth in claim 1 wherein the tenth means include a second saturable amplifier having conductive and non-conductive states and having saturable characteristics in the conductive state and having characteristics for producing a voltage having a first particular amplitude in the non-conductive state and for producing a voltage having a second particular amplitude distinctively different from the first particular amplitude in the saturable state and responsive to the difference between the voltages on the common terminals in the third and fourth impedance branches for producing a voltage having the first particular amplitude for difference voltages of any magnitude and of a first polarity and having the second amplitude for difference voltages of any magnitude and of a second polarity.

7. A method of testing an impedance bridge to determine if the bridge is balanced, including the steps of:
providing (a) a bridge circuit defined by a first impedance member of unknown impedance value, a second impedance member having an impedance value variable between particular known limits, a third impedance member having a particular impedance value and a fourth impedance member having a particular impedance value, with the first, second, third and fourth impedance members being connected to provide in the bridge circuit a first terminal connected to a first pair of the impedance members and a second terminal connected to a second pair of the impedance members; and
(b) means connected to the bridge circuit to produce an output voltage in accordance with the relative magnitudes of the signals on the first and second terminals in the bridge and for introducing the output voltage to the bridge circuit in a positive feedback to accelerate the response of the bridge circuit to changes in the relative values of the first and second impedance members and to provide for the production of an output voltage of a first amplitude for relative unbalances of a first polarity in the values of the first and second impedance members and to provide for the production of an output voltage of a second amplitude distinctively different from the first amplitude for relative unbalances of a second polarity in the values of the first and second impedance members;
adjusting the value of the second impedance member in a first direction between the particular limits to produce an output signal having the first amplitude;
thereafter adjusting the value of the second impedance member between the particular limits in a second direction opposite to the first direction until the output signal has the second amplitude; and determining the value of the first impedance member in accordance with the value of the second impedance member when the output signal changes from the first amplitude to the second amplitude.

8. A method for measuring the unknown value of a first impedance member including the steps of:
providing (a) second and third impedance members having particular values of impedance,
b. a fourth impedance member having a value of impedance variable between particular values, and
c. amplification means having a pair of input terminals and properties for amplifying particular characteristics of signals appearing on the input terminals and properties of becoming saturated upon the introduction of signals of a particular relationship to the input terminals to provide a first output in the non-saturated state and a second output in the saturated state when the second output is distinctively different from the first output;
connecting the first, second, third, and fourth impedance members to form an impedance bridge having a pair of impedance branches each including a terminal common to the pair of impedance members in the branch, the common terminals coupled to the input terminals of the coupling means to obtain from the amplification means the first output when the first impedance means has a first particular impedance relationship to the fourth impedance means and to obtain the second output when the first impedance means has a second relationship to the fourth impedance means where the second relationship is opposite to the first relationship;
varying the value of the fourth impedance member until the output signal of the amplification means changes from the first particular characteristics to the second particular characteristics; and
thereupon determining the value of the unknown impedance in accordance with the relative values of the first and third impedance members.

9. The method as set forth in claim 8 further including the steps of:
introducing the output signal of the amplification means to each of the impedance branches to provide the output signal with accelerating characteristics when the first impedance means has the first relationship with the fourth impedance means and to provide the output signal with stable characteristics when the first impedance means has the second relationship with the fourth impedance means;
providing a first visual indication when the output signal has the accelerating characteristics and a second visual indication when the output signal has the stable characteristics; and
varying the impedance of the fourth impedance means until the indicating means provides the first visual characteristics.

10. Apparatus for determining the value of an unknown impedance, including:
a first impedance branch including first and second impedance members serially connected to define a first common terminal;
a second impedance branch including third and fourth impedance members serially connected to define a second common terminal;
means connecting the first and second impedance branches in parallel to define a first impedance bridge having a third common terminal and a fourth common terminal;
a first particular one of the first, second, third and fourth impedance members providing the unknown impedance to be determined;
a second particular one of the first, second, third and fourth impedance members having an adjustable impedance;
means for providing an operating potential;
the first and second impedance branches having characteristics to respond to the operating potential at the third common terminal to provide at the first common terminal a voltage dependent upon the relative impedances of the first and second impedance members and to provide at the second common terminal a voltage dependent upon the relative impedances of the third and fourth impedance members;
output means having characteristics responsive to the voltages on the first and second common terminals and connect to the third output terminal to provide a positive feedback to the third common terminal of the difference in potentials at the first and second common terminals and thereby provide at the third common terminal an output potential having either the first amplitude of the second amplitude dependent upon the relative impedances of the first, second, third and fourth impedance members and to vary the potential at the first and second operating terminal in accordance with the first and second amplitudes of the output potential,
the output means having stable characteristics to produce first characteristics in the output potential when the relative impedances of the first, second, third and fourth impedance members define a first relationship and having unstable characteristics to produce second characteristics in the output potential when the relative impedance of the first, second, third and fourth impedance members define a second relationship different from the first relationship, and the apparatus further comprising means responsive to the characteristics of the output potential for detecting a change in the relative impedances of the first, second, third and forth impedance members from the first relationship to the second relationship when the output potential changes from the first characteristics to the second characteristics.

11. The apparatus set forth in claim 10 wherein the means responsive to the characteristics of the output signal includes:
means responsive to the stable characteristics of the output means to adjust the impedance of the particular impedance member on a progressive basis to change the characteristics of the output means from the stable characteristics to the unstable characteristics and means responsive to the change in the output potential from the first characteristics to the second characteristics to interrupt the adjustments in the impedance of the second particular one of the impedance members.

12. The apparatus recited in claim 11 further comprising a digital display responsive to the first characteristics of the output potential to provide for variations in the indication of the display and responsive to the second characteristics of the output potential to provide for variations in the indication of the display and responsive to the second characteristics of the output potential to provide a visual indication of the impedance of the first particular one of the impedance members.

13. Apparatus for determining the value of an unknown impedance, including:
a first impedance branch including first and second impedance members serially connected to define a first common terminal;
a second impedance branch including third and fourth impedance members serially connected to define a second common terminal;
means connecting the first and second impedance branches in parallel to define a first impedance bridge having a third common terminal and a fourth common terminal;
a first particular one of the first, second, third and fourth impedance members providing the unknown impedance to be determined;
a second particular one of the first, second, third and fourth impedance members having an adjustable impedance;
means for providing an operating potential;
the first and second impedance branches having characteristics to respond to the operating potential at the third common terminal to provide at the first common terminal a voltage dependent upon the relative impedances of the first and second impedance members and to provide at the second common terminal a voltage dependent upon the relative impedances of the third and fourth impedance members;
output means having characteristics responsive to the voltages on the first and second common terminals and connect to the third output terminal to provide a positive feedback to the third common terminal of the difference in potentials at the first and second common terminals and thereby provide at the third common terminal an output potential having either the first amplitude or the second amplitude dependent upon the relative impedances of the first, second, third and fourth impedance members and to vary the potential at the first and second operating terminal in accordance with the first and second amplitudes of the output potential,
the second particular one of the impedance members including:
a third impedance branch including fifth and sixth impedance members serially connected to define a fifth common terminal;
a fourth impedance branch including seventh and eighth impedance members serially connected to define a sixth common terminal;
the third and fourth impedance branches connected to define a second impedance bridge having a seventh common terminal;
one of the fifth, sixth, seventh and eighth impedance members having an adjustable impedance;
the second bridge having characteristics to respond to an operating potential at the seventh common terminal to provide at the fifth common terminal a voltage dependent upon the relative impedances of the fifth and sixth impedance members and to provide at the sixth common terminal a voltage dependent upon the relative impedances of the seventh and eighth impedance members; and
output means responsive to the voltages on the fifth and sixth common terminals to provide at the seventh common terminal an operating potential having characteristics dependent upon the relative impedances of the fifth, sixth, seventh and eighth impedance members and to provide at the fifth and sixth common terminals voltages dependent upon such operating potential.

14. In combination for determining an unknown value of impedance, comprising:
first impedance means for providing the unknown value of impedance to be determined;
second impedance means for providing an impedance adjustable through a range of known values of impedance;
third impedance means providing a first particular value of impedance;
fourth impedance means providing a second particular value of impedance;
first connecting means coupling the first, second, third and fourth means in a bridge to form first and second impedance branches each including an individual pair of the first, second, third and fourth impedance means and each including a common terminal between the impedance means in that branch;
fifth means responsive to the voltage on the common terminal in the first impedance branch and the voltage on the common terminal in the second impedance branch for producing an output voltage representing any voltage difference between the voltage on such common terminals;
sixth means responsive to the output voltage from the fifth means for introducing such output voltage to the first and second impedance branches in a positive feedback to energize such impedance branches for the production, on the common terminal in the first impedance branch and the common terminal of the second impedance branch, of voltages having a first value for unbalances of a first particular amplitude in the relative values of the impedances in the first and second impedance branches and voltages having a second particular amplitude distinctively different from the first particular amplitude for unbalances of a second polarity in the relative values of the impedance in the first and second impedance branches,
the first connecting means coupling the first and second impedance branches in parallel to provide the bridge with a first particular pair of terminals common to the first and second impedance branches; and
the sixth means being responsive to the output voltage of the fifth means for introducing such output voltage to one of the first particular pair of terminals in a positive feedback to provide the output voltage of the fifth means with first particular characteristics when the first, second, third and fourth impedance means have a first particular relationship of impedance values and to provide such output voltage with second particular characteristics distinctively different from the first particular characteristics when the first, second, third and fourth impedance means have a second particular relationship of impedance values.

15. The combination recited in claim 14 further comprising:
connecting means responsive to the output signal from the fifth means for providing a plurality of recurrent impulses when the first, second, third, and fourth impedance means have the first particular relationship and for inhibiting provision of such recurrent impulses when the first, second, third, and fourth impedance means have the second particular relationship;
activating means responsive to the plurality of recurrent impulses from the last mentioned means to adjust the impedance of the second impedance means on a progressive basis so that the relative impedances of the first, second, third, and fourth impedance means change progressively from the first particular relationship to the second particular relationship; and
display means responsive to the plurality of recurrent impulses from the connecting means for providing an indication when the relative impedances of the first, second, third and fourth impedance means have the second particular relationship.

* * * * *